March 30, 1948.  G. N. COLE  2,438,540
SUPPORT FOR ENGINE COOLING FANS
Filed April 1, 1944
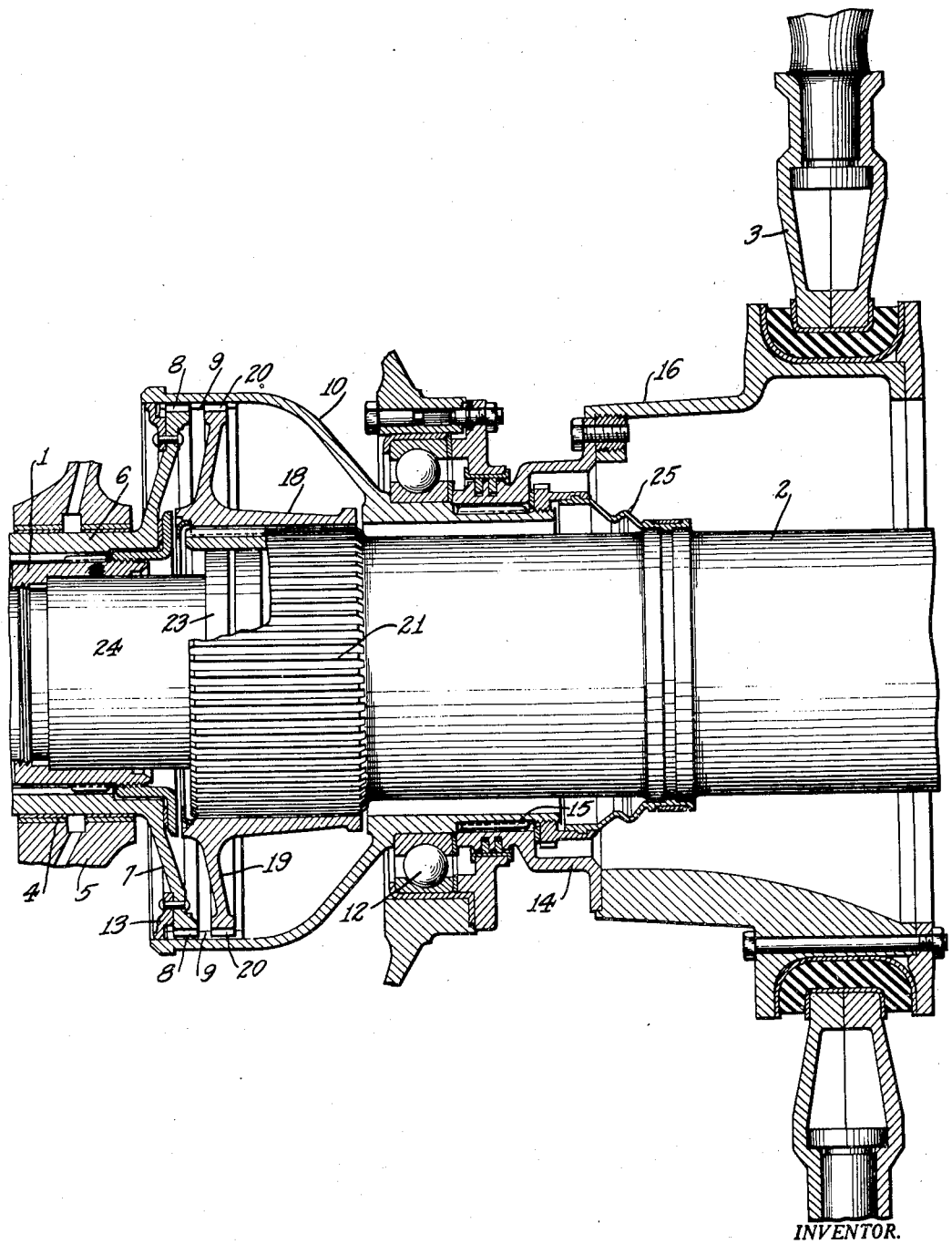
INVENTOR.
GILMOURE N. COLE
BY John C. Kerr
ATTORNEY Patented Mar. 30, 1948

2,438,540

UNITED STATES PATENT OFFICE 2,438,540

SUPPORT FOR ENGINE COOLING FANS

Gilmoure Nichols Cole, Manchester, Conn., assignor to United Aircraft Corporation, East Hartford, Conn., a corporation of Delaware Application April 1, 1944, Serial No. 529,077

14 Claims. (Cl. 230—272)

1

This invention relates to supports for engine cooling fans and has for its object to provide a novel and improved fan support for an air-cooled aircraft engine.

Another object of the invention is to provide a simple and efficient fan support for an air-cooled aircraft engine employing a reduction gear driven propeller, in which the fan is mounted in axial alignment with the crankshaft of the engine and is driven thereby independently of an extension power shaft leading to the gear box which houses the reduction gear for the propeller.

Still another object is to provide a fan mounting of the above type in which the extension power shaft for the fan, which is connected to the crankshaft of the engine, passes through the hub of the fan but is independent thereof so that said extension shaft may wobble relative to the crankshaft or may be withdrawn therefrom as a unit without in any way disturbing the fan.

Various other objects and advantages will be apparent as the nature of the invention is more fully disclosed.

Although the novel features which are characteristic of this invention are set forth more in detail in the claims appended hereto, the nature and scope of the invention may be better understood by referring to the following description, taken in connection with the accompanying drawing forming a part thereof, in which a specific embodiment has been set forth for purposes of illustration.

The drawing shows a vertical sectional view through an engine crankshaft, extension power shaft, and fan mounting embodying my invention.

In the following description certain specific terms are used for convenience in referring to the various details of the invention. These terms, however, are to be interpreted as broadly as the state of the art will permit.

The drawing shows the crankshaft 1 of an air-cooled aircraft engine, an axially aligned extension power shaft 2 leading to a remote reduction gear box for driving the propeller (not shown), and a fan 3 for cooling the engine cylinders.

The fan 3 is of the type disclosed in a copending application of Claude O. Broders, Serial No. 453,969, filed August 7, 1942, Patent No. 2,354,101, July 18, 1944. As its construction forms no part of the present invention it will not be described in detail.

In the embodiment illustrated, the front end of the engine crankshaft 1 is supported in a bearing 4 carried by a portion of the engine crankcase 5. A cylindrical sleeve 6 having a dished flange 7 is splined onto the front end of the crankshaft 1 and is supported in the bearing 4, the crankshaft 1 being within the cylindrical portion of sleeve 6 and concentric therewith.

The flange 7 of sleeve 6 is provided with peripheral teeth 8 engaging corresponding internal teeth 9 in a bell shaped housing 10 which is supported in an outboard bearing 12. The flange 7 carries an annular centering ring 13 which maintains the housing 10 concentric with the sleeve 6 and the crankshaft 1. Outside of or axially spaced from the bearing 12 there is a cup-shaped collar 14 which is splined at 15 onto the housing 10 and carries the supporting hub 16 of fan 3 so that the fan is rigidly supported on the crankshaft 1 and will partake of any movement of the engine.

The extension power shaft 2 extends through the hub 16 of fan 3 and through the housing 10, and it is drivingly connected with the housing 10 by means of a cylindrical sleeve 18 having a flange 19 that is provided with peripheral teeth 20 which engage the internal teeth 9 of the housing 10. The sleeve 18 is splined at 21 to the extension shaft 2, and this shaft is additionally supported on a partly spherical internal bearing member 23 secured to the front end of the crankshaft 1 by a sleeve 24. It will thus be evident that the extension shaft 2 is supported on the crankshaft 1 and is so connected therewith as to be driven thereby but has freedom of universal movement with respect to this crankshaft so that the engine can move without loading the extension power shaft 2 by binding.

A flexible seal 25 to prevent access of dirt is suitably connected between the extension shaft 2 and the housing 10 so as to close the opening therebetween.

From the foregoing description it will be noted that the axis or hub 16 of fan 3 is at all times rigidly supported on the engine axis through the bearings 4 and 12 and the centering ring 13, while the extension power shaft 2 which passes through the center of fan hub 16 is connected to the crankshaft 1 independently of the fan drive. This allows the extension shaft 2 several degrees of angular freedom and permits it to wobble slightly relative to the engine without causing the fan to wobble in a corresponding manner.

Another advantage of my construction is that it enables the extension shaft 2 to be readily withdrawn from the engine as a unit, which greatly facilitates installation. The extension shaft 2 will also withdraw from the engine if the remote gear box and propeller (not shown) are dropped from the aircraft to allow the pilot to escape from a pusher installation.

Although a specific embodiment of the invention has been shown for purposes of illustration it is to be understood that the invention is capable of various modifications and adaptations which will be readily apparent to a person skilled in the art. The invention is only to be limited in accordance with the scope of the appended claims.

What I claim is:

1. In a device for cooling aircraft engines, a crankshaft and a longitudinally separable extension power shaft, a fan driven by said crankshaft, and means comprising a hollow shaft for driving said power shaft from said crankshaft independently of said fan drive.

2. In a device for cooling aircraft engines, a crankshaft, an extension power shaft, a fan having a support surrounding said power shaft, means for driving said fan from said crankshaft, and means comprising a hollow shaft for driving said power shaft from said crankshaft independently of said fan drive.

3. In a device for cooling aircraft engines, a crankshaft, an extension power shaft, a fan having a support surrounding said power shaft, means for driving said fan from said crankshaft, and means comprising a hollow shaft including a longitudinally separable coupling between said crankshaft and said power shaft for driving the latter independently of said fan drive.

4. In a device for cooling aircraft engines, a crankshaft and a separate extension power shaft, a bell housing concentric with said crankshaft and driven thereby, a fan having a support surrounding said power shaft and secured to said housing to drive said fan directly from said crankshaft, and means comprising a hollow shaft for driving said power shaft from said housing independently of said fan.

5. In a device for cooling aircraft engines, a crankshaft and a separate extension power shaft, a peripherally toothed gear secured to said crankshaft, a bell housing concentric with said crankshaft and having internal teeth engaging the peripheral teeth of said gear, a fan having a support surrounding said power shaft and secured to said housing to drive said fan directly from said crankshaft, and a second peripherally toothed gear splined to said power shaft within said housing and engaging the internal teeth thereof to drive said power shaft independently of said fan.

6. In a device for cooling aircraft engines, a crankshaft and a separate extension power shaft mounted in axial alignment, a sleeve having a peripherally toothed flange secured to said crankshaft, a bell housing disposed about said power shaft and having internal teeth engaging the peripheral teeth on said flange, a fan having a support surrounding said power shaft and secured to said bell housing to drive said fan directly from said crankshaft, and a sleeve connected to said power shaft within said bell housing and having a peripherally toothed flange engaging the internal teeth of said housing to drive said power shaft independently of said fan.

7. In a device for cooling aircraft engines, a crankshaft and a separate extension power shaft mounted in axial alignment, a sleeve having a peripherally toothed flange secured to said crankshaft, a bell housing mounted on bearings externally of said power shaft and having internal teeth engaging the peripheral teeth on said flange, a fan having a supporting hub surrounding said power shaft and secured to said bell housing to drive said fan directly from said crankshaft, and a sleeve connected to said power shaft within said bell housing and having a peripherally toothed flange engaging the internal teeth of said housing whereby rotary movement of said crankshaft is imparted to said power shaft independently of said fan drive.

8. In a device for cooling aircraft engines, a crankshaft and a separate extension power shaft mounted in axial alignment, a sleeve having a peripherally toothed flange secured to said crankshaft, a bell housing mounted on bearings externally of said power shaft and having internal teeth engaging the peripheral teeth on said flange, means for maintaining said bell housing concentric with said sleeve and said crankshaft, a fan having a supporting hub surrounding said power shaft and secured to said bell housing whereby to drive said fan directly from said crankshaft, and a sleeve detachably connected to said power shaft within said bell housing and having a peripherally toothed flange engaging the internal teeth of said housing whereby rotary movement of said crankshaft is imparted to said power shaft independently of said fan drive.

9. In a device for cooling aircraft engines, a crankshaft and a separate extension power shaft mounted in axial alignment, a sleeve having a peripherally toothed flange secured to said crankshaft, a bell housing mounted on bearings externally of said power shaft and having internal teeth engaging the peripheral teeth on said flange, a centering ring carried by said flange and cooperating with said bell housing to maintain same concentric with said sleeve and said crankshaft, a fan having a supporting hub surrounding said power shaft and secured to said bell housing whereby to drive said fan directly from said crankshaft, and a sleeve splined on said power shaft within said bell housing and having a peripherally toothed flange engaging the internal teeth of said housing whereby rotary movement of said crankshaft is imparted to said power shaft independently of said fan drive.

10. In a device for cooling aircraft engines, a crankshaft and a separate extension power shaft mounted in axial alignment, a sleeve having a peripherally toothed flange secured to said crankshaft, a bell housing mounted on bearings externally of said power shaft and having internal teeth engaging the peripheral teeth on said flange, a centering ring carried by said flange and cooperating with said bell housing to maintain same concentric with said sleeve and said crankshaft, a fan having a supporting hub surrounding said power shaft and secured to said bell housing whereby to drive said fan directly from said crankshaft, a sleeve splined on said power shaft within said bell housing and having a peripherally toothed flange engaging the internal teeth of said housing whereby rotary movement of said crankshaft is imparted to said power shaft, and an internal bearing member for the end of said power shaft carried by the adjacent end of said crankshaft.

11. In a device of the character described, an engine shaft, a separate shaft aligned with said engine shaft, means comprising a housing having gear teeth thereon and sleeves on said shafts having flanges provided with teeth along their outer peripheries meshing with the teeth on said housing for connecting said shafts to cause them to rotate together, a fan, and means to cause said fan to rotate when said shafts are rotated.

12. The device of claim 11 in which said connecting means include a splined member.

13. The device of claim 11 in which said connecting means include a plurality of splined members.

14. The device of claim 11 in which said connecting means include a plurality of cylindrically shaped members.

GILMOURE NICHOLS COLE.

REFERENCES CITED

The following references are of record in the file of this patent:

UNITED STATES PATENTS

| Number | Name | Date |
| --- | --- | --- |
| 1,513,335 | Massey | Oct. 28, 1924 |
| 1,733,361 | Rice | Oct. 29, 1929 |
| 2,041,507 | Zeder | May 19, 1936 |

FOREIGN PATENTS

| Number | Country | Date |
| --- | --- | --- |
| 242,171 | Great Britain | Nov. 5, 1925 |
| 687,665 | Germany | Feb. 3, 1940 |